Aug. 22, 1961  W. O. WILLIAMS, JR  2,996,828
SAFETY FISHHOOKS
Filed June 17, 1957  5 Sheets-Sheet 3

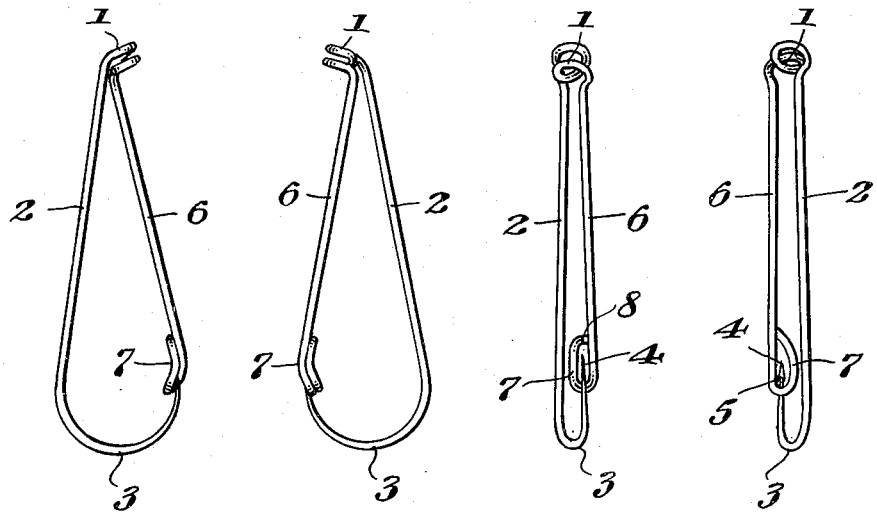
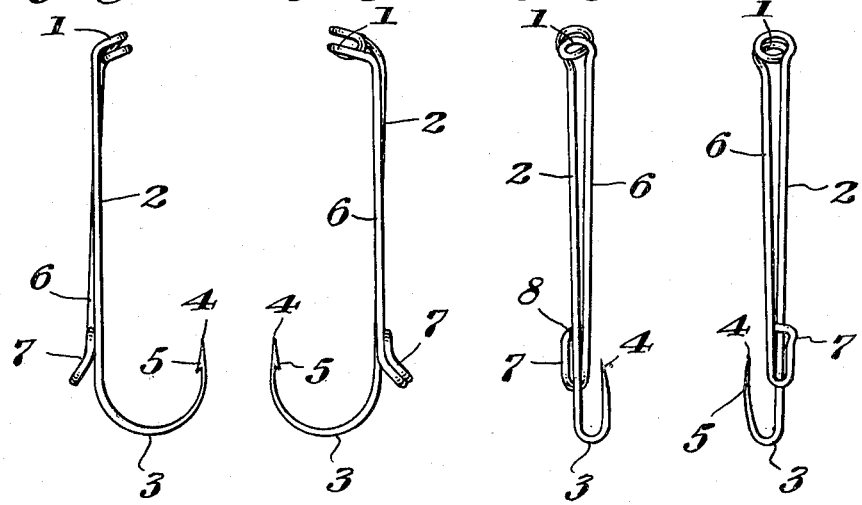

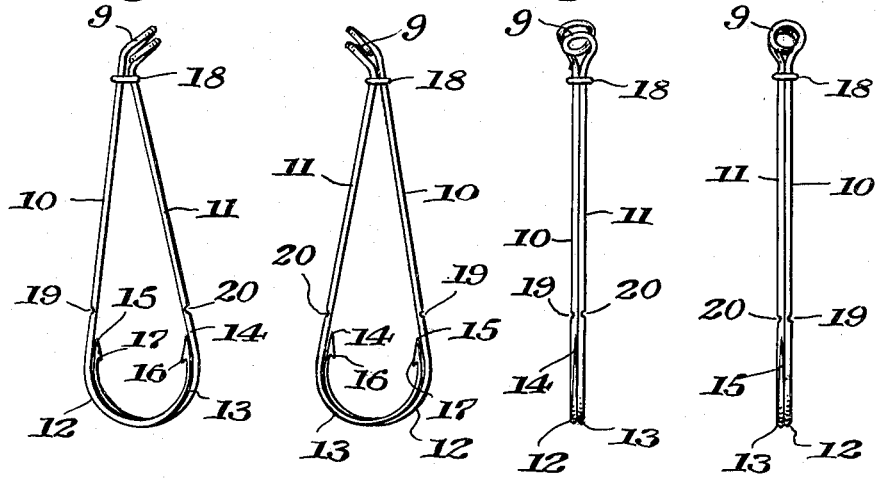
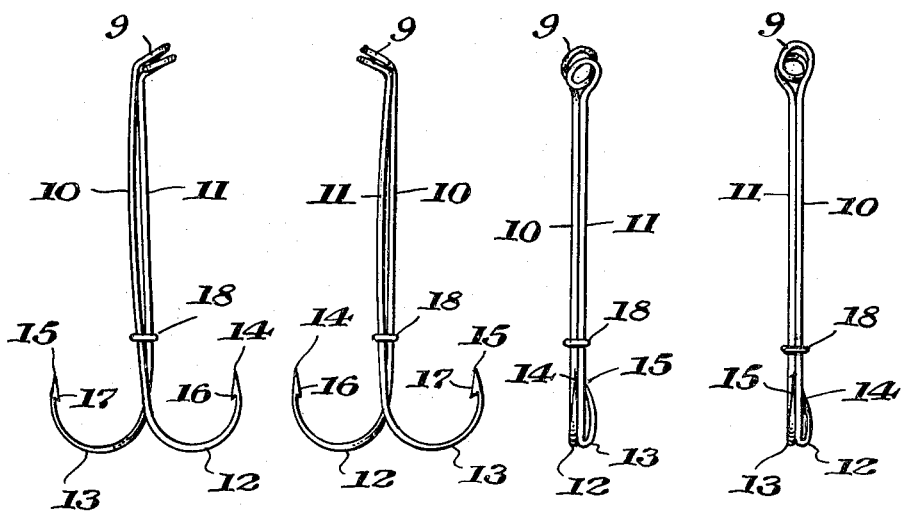

INVENTOR
William O. Williams, Jr.
BY
Wenderoth, Lind & Ponack
ATTYS.

Aug. 22, 1961  W. O. WILLIAMS, JR  2,996,828
SAFETY FISHHOOKS
Filed June 17, 1957  5 Sheets-Sheet 5

INVENTOR
William O. Williams Jr.
BY
Wenderoth, Lind & Ponack
ATTYS.

United States Patent Office 2,996,828
Patented Aug. 22, 1961

2,996,828
SAFETY FISHHOOKS
William O. Williams, Jr., Marion, N.C.
(1309 Lynhurst Drive, Gastonia, N.C.)
Filed June 17, 1957, Ser. No. 665,936
Claims priority, application Japan July 3, 1956
8 Claims. (Cl. 43—43.4)

This invention relates to safety fish hooks.

An object of the present invention is to provide a fish hook that is convenient, useful and economical and that can be kept safely whether in use or not and which will perform efficiently when fishing.

An important object of this invention is to provide a fish hook which can be kept safely and which offers protection against injurious accidents owing to a simple construction which protects the point of the hook at all times when in use or when storing. This hook also prevents snagging when casting the line or when coming in contact with underwater objects when moving through the water. The point of the hook is also prevented from coming in strong contact with other objects when not in use, and thus the point is protected from damage and dulling. Also, the line can be prevented from becoming tangled with the hook. The hook in the present invention which can always be kept in safety so as not to become damaged by its point coming in contact with other objects besides fishes, can always maintain a sharp point as a natural result of the above and therefore the action and result of hooking the fish can be maintained at its highest efficiency.

Another object of this invention is to provide a novel safety fish hook which can be manufactured comparatively easily and cheaply in almost any size and shape and with any type of point, with accuracy in action which is accident proof and has a simple construction.

A further object of this invention, especially when a single hook is used, is to provide a novel safety fish hook which prevents wasteful loss of bait when fishing and therefore not only increases the efficiency of the hook but also enables the economical use of expensive baits and lures and also helps prevent the hooked fish from escaping from the hook.

A further object of this invention is to provide a convenient, useful, novel and superior safety fish hook as described above and to economize on expensive hooks and baits and artificial baits and lures which hitherto were wastefully lost.

A further object of the invention is to provide a safety barbless fish hook which can be manufactured comparatively easily and cheaply due to the elimination of the customary barb.

A further object is to provide a safety barbless fish hook which prevents wasteful loss of bait or lures when fishing and has the advantage of keeping fish alive longer.

A still further object of the invention is to provide a fish hook which will not injure a fish's mouth and which has means thereon for preventing the disengagement of a fish after being hooked.

A further object of the invention is to provide a fish hook having increased weight which will make the need for sinkers unnecessary and in which a greater area is provided on which lines, plugs, flies and bait may be secured.

A still further object of the invention is to provide an improved construction wherein means are provided for locking a fish within the safety fish hook and wherein means are provided for forcing the mouth of a fish into the bend of the hook and simultaneously closing the throat of the hook so that a fish can not escape.

With the above and other objects in view which will become apparent from the detailed description below the improved fish hooks are shown in the drawings in which:

FIGURE 1 is an elevational view of one side of a single hook;

FIGURE 2 is a similar view of the other side of the hook shown in FIGURE 1;

FIGURE 3 is a front elevational view of the hook shown in FIGURE 1;

FIGURE 4 is a back elevational view of the hook;

FIGURE 5 is a side elevational view of the hook shown in FIGURE 1 when in operating position;

FIGURE 6 is a similar view of the other side of the hook shown in FIGURE 5;

FIGURE 7 is a front view of the hook of FIGURE 5;

FIGURE 8 is a back view of the hook shown in FIGURE 5;

FIGURE 9 is a side elevational view of a double hook unbaited and in closed safety position;

FIGURE 10 is a similar view of the other side of the hook shown in FIGURE 9;

FIGURE 11 is a front elevational view of the hook of FIGURE 9;

FIGURE 12 is a rear elevational view of the hook of FIGURE 9;

FIGURE 13 is a side elevational view of the double hook of FIGURE 9 when in open operating position;

FIGURE 14 is a similar view of the other side of the open hook shown in FIGURE 13;

FIGURE 15 is a front elevational view of the open hook of FIGURE 13;

FIGURE 16 is a back elevational view of the hook of FIGURE 13;

In the drawings, liker reference characters indicate like parts.

Figure 17:
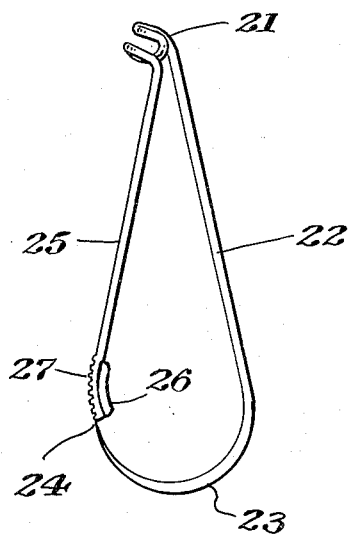
FIGURE 17 is a side elevational view of a modification.

In FIGURES 1 to 8 inclusive, a single hook is shown which may be constructed from any suitable metal such as a spring steel wire of appropriate diameter and which may be tempered or untempered. Near the center of the wire circles are formed so as to construct the spring eye 1. The number of windings in the eye 1 and the shape thereof is optional depending upon the thickness of the wire, the diameter of the eye, the desired type of hook and the desired strength.

Then the two lengths of wire, after forming the spring eye 1 are brought together and bent at a certain angle in order to form the desired type of eye. The bends adjacent the eye itself at the top and bottom and the two lengths of wire are slightly apart in order to form an acute angle at the bend near the eye.

The main shank 2 of the wire is bent at the end opposite the eye 1 to form the bend 3 with the point 4 pointing upwardly and the barb 5. The other end of the wire forms the guard shank 6 which has an oblong circle at the end opposite the spring eye 1. The oblong circle is bent in an obtuse angle from the length of wire along its longer diameter thus forming the sheath 7 in which the point 4 of the hook may be seated as shown in FIGURES 1 to 4 inclusive. The tension of the spring eye 1 is adjusted so that the point 4 will fit exactly into the sheath 7. An indentation 8 is made in the sheath 7 at the part of the oblong circle that is closest to the spring eye 1.

When the hook has been constructed as above described the hook may be tempered and subsequently subjected to any other treatment such as sharpening, polishing, coloring by oxidation, etc., thereby completing the single fish hook.

The fish hook has the protecting wall of sheath 7 in light contact with the point 4 due to the spring action of the spring eye 1 and the point 4 is completely hidden within the sheath 7. Therefore any protection means for the point of the fish hook when wrapping or carrying the same becomes unnecessary. In order to arrange the hook for a fishing operation the guard shank 6 is pushed towards the main shank 2 and brought against the back side of the main shank 2 so that the indentation 8 in the sheath 7 fits around the back side of the main shank 2 as shown in FIGURES 5 to 8 inclusive. The sheath 7 is completely caught on the main shank 2 owing to the spring action of the spring eye 1 and the hook point 4 is exposed in the normal manner and the pointed hook is maintained sharp by the protection means above described.

The sheath 7 can also be used with a forward pressure for putting natural or artificial bait or lures on the hook and such bait or lures will be more difficult to come off the hook as compared to conventional hooks. Also when there is a likelihood of the hook becoming caught in casting or on some submerged object or when the bait comes off the hook easily the present safety hook can be baited while in its original closed condition as shown in FIGURES 1 to 4 without moving the guard shank to expose the hook point and when the hook is used in this way the guard shank 6 is forced over towards the main shank 2 by the force of the fish bite or strike when the fish takes the baits or lures and thereby exposes the hook point 4 to catch the fish. Once the fish is caught by the hook it will be difficult for the fish to get off the hook because through the spring action of the spring eye 1 the sheath 7 of the guard shank 6 will be applying constant pressure towards the hook point 4 or in case of complete hooking the sheath 7 imbeds the hook point 4 thereby enabling a sure catch. The bait will also be difficult to lose and consequently it will be most effectively used. The hook itself will almost never catch on any object other than the fish which it is intended for.

In FIGURES 9 to 16 inclusive, a double hook is shown. The material for the hook, the shape, number of turns sizes, angle of bend and the inclination and types of spring eyes 9 are the same as those described above with respect to a single hook.

The double hook has two lengths of wires extending from the spring eye 9 forming main shanks 10 and 11. The ends of these shanks are bent and turned inwardly towards each other forming the bends 12 and 13. Each end of the two shanks form the hook points 14 and 15 and at the base of such points the barbs 16 and 17 are formed. The two hooks facing each other in this way are so positioned that the bends 12 and 13 wind about one another.

As shown in FIGURES 9 to 12 inclusive, the tension of the spring eye 9 is adjusted so that the hook points 14 and 15 are laid exactly against the inner sides of the main shanks 10 and 11 located at opposite sides.

A guard ring 18 securely holds the shanks 10 and 11 together when in full operating position. This guard ring 18 is movably placed about the shanks 10 and 11 close to the base of the spring eye 9 and small grooves 19 and 20 are made on one side only of the main shanks 10 and 11 at a section located nearest to the bends therein. The grooves 19 and 20 are for the standard ring 18 which fits therein when the two hooks are disposed in operative position as shown in FIGURES 13 to 16. The double hook may be completed by subjecting said hook to the same operations of tempering, sharpening, and coloring as described above with respect to the hook of FIGURE 1.

The double hook may be kept with its multiple points laid flatly against the inner sides of their opposing main shanks as shown in FIGURES 9 to 12 when not in use. Therefore the hook points will not become damaged during handling, storing, wrapping, carrying, etc., and it will be unnecessary to take any precautionary measures for maintaining the hooks in sharp condition.

For fishing the two main shanks 10 and 11 are brought together. Simultaneously the guard ring 18 will be moved downwardly towards the joint and fall into the grooves 19 and 20 thereby maintaining the two main shanks together. The multiple hooks will now form a perfect double multiple hook as shown in FIGURES 13 to 16. The sharp hook points are exposed and kept firmly in position thereby permitting satisfactory hooking of fish. Also, by utilizing the guard ring 18 natural and artificial baits and lures may be attached easily to the hooks. The attached bait or lures will also be prevented from coming off.

When there is a likelihood that the hook will be caught while casting or upon some submerged object in the water the double hook may also be baited or attached to lures and used in the position as shown in FIGURES 9 to 12.

Auxiliary elements may be attached to the spring eyes 1 or 9 or to the shanks 2, 10 and 11 and the tying or attaching of these elements to the hooks is sure and easy. When using the conventional fish hooks it is necessary to attach a weight or sinker on the line close to the hook or lure in order to obtain stability, therefore a further advantage of the present invention is that the hooks described herein are very stable due to their construction and consequently it will not be necessary to use weights or sinkers other than those which are absolutely required. This will also allow a more sensitive touch when the fish takes or strikes the bait or lures and thus enable easier fishing.

In FIGURES 17 to 24 inclusive, some forms of barbless fish hooks are shown which would not injure the fish's mouth when fishing and may always be kept safely when in use or when not in use.

Figure 18:
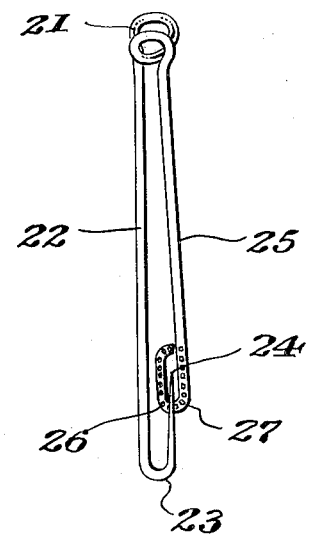
FIGURE 18 is a front elevational view of the hook shown in FIGURE 17.
Figure 19:
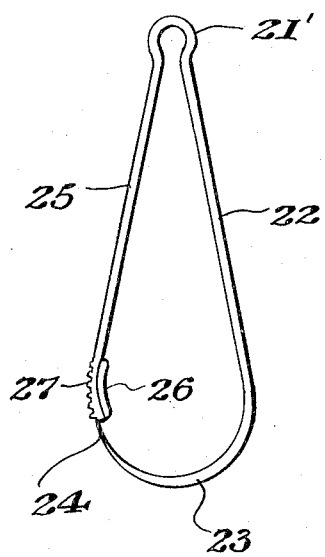
FIGURE 19 is a side elevational view of a further modification.
Figure 20:
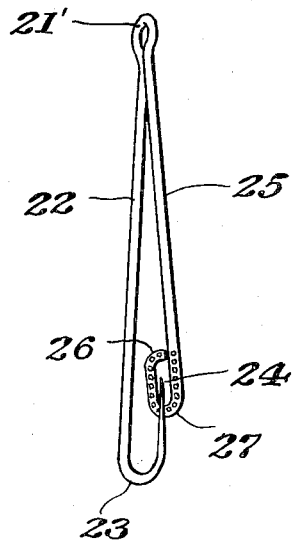
FIGURE 20 is a front elevational view of the hook shown in FIGURE 19.

In FIGURES 17 and 18 the spring eye is shown at 21 while in FIGURES 19 and 20 the spring eye has only a single turn and is shown at 21'. The main shank is shown at 22 having a bend 23 therein with a point 24. The guard shank 25 has a sheath 26 thereon provided with indentations 27 upon the outer surface of the sheath.

In this form of the invention any suitable metal such as spring steel wire may be used. The sheath 26 is first formed at one end of the wire and then the spring eyes 21 or 21' are formed by winding the wire around forming dies. Then the bend 23 and the point 24 are formed by means of dies and grinding the points 24 and the indentations are provided on the outer surface of the sheath.

After the manufacturing operation annealing or hardening operation of the material or color finishing may be applied if necessary.

Figure 21:
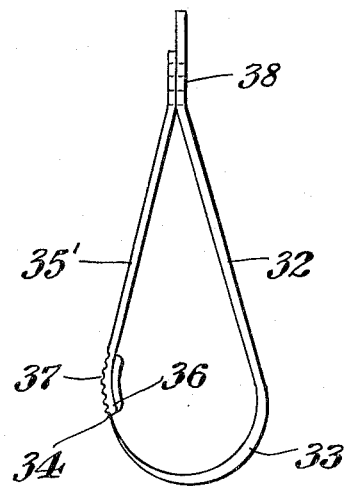
FIGURE 21 is a side elevational view of a further modification.
Figure 22:
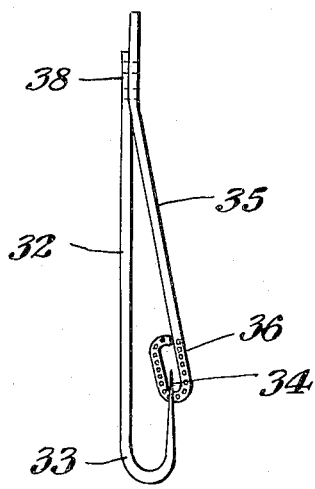
FIGURE 22 is a front view of the modification shown in FIGURE 21.
Figure 23:
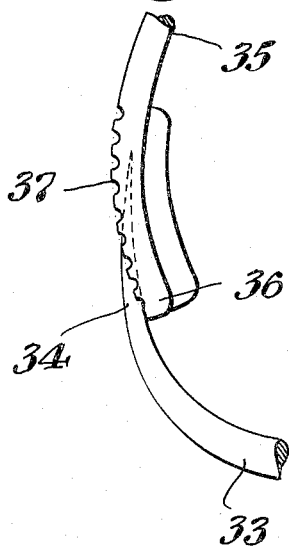
FIGURE 23 is an enlarged partial view showing one example of identations.
Figure 24:
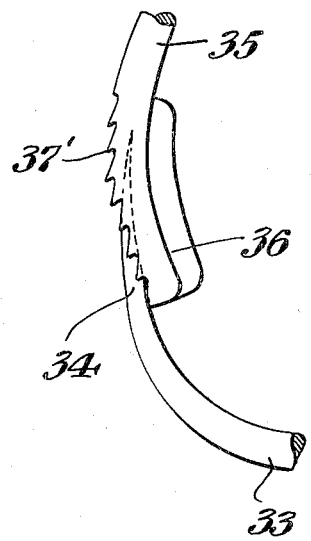
FIGURE 24 is a view similar to that shown in FIGURE 23 illustrating another type of indentation.

Further, to simplify the operation the hook may be formed as illustrated in FIGURE 21 and FIGURE 22. In this case, the shank 32, the bend 33 and the point 34 are formed from a wire material with a polished point by means of dies, then a guard shank with a sheath on one end is attached rigidly by means of welding it in a suitable position relative to other portions of the hook as shown at 38 in FIGURES 21 and 22 and applying some protective coating on the hook. This process has many advantages in which not only material savings can be made by the short length of wire used, but also the loss of material by misworking can be reduced to the minimum according to its separately workable shank construction. As shown in the drawings the relative position of certain parts of the hooks are as follows; the guard shank 35 or 35' and main shank 32 extend downwardly diverging from the spring portion 38, and the point 34 is embedded in the sheath 36 which urges the point outwardly by the spring action of said portion.

The indentation 37 on the surface of the sheath acts to prevent the release of the fish by means of the frictional force at this portion which causes the guard shank 35 to rotate in a clockwise direction (FIGURES 21 and 22) and press the fish's lip between the point 34 and the sheath 36 forcibly so that the catch will not be able to escape from the hook. If the hooked fish's mouth slips down into the bend, the guard shank 35, the sheath 36 and the point 34 will close the opening and the catch cannot get out.

When we use this barbless fish hook, first of all we put the bait onto the point and bend so as to pinch a part of the bait between the point 34 and the sheath 36. The indentations 37 prevent the bait from disengaging by the friction as described above. As a fish bites the baited hook, the guard shank 35 is urged inward by the action of the fish's mouth when it strikes and the removal of the sheath 36 from the point 34 results in the fish being hooked. Once it is hooked, the fish's lip is pinched between the point 34 and the sheath 36 and cannot escape from the hook.

Thus, though the fish might be held firmly between the point and the sheath, it would be quite easy to take off the fish owing to there being no barb on the hook by pushing the guard shank lightly inward with the finger and the fish can be taken off smoothly with no harmful damage to the fish.

FIGURES 25 to 28 inclusive show a single fish hook of modified construction while FIGURES 29 to 32 show a modified construction of the double hook.

The primary object of this invention is to provide, in a safety fish hook, by means of a novel and improved construction, means of locking a fish within a safety fish hook. Another object is to provide a novel and improved safety fish hook device which by its action will force the mouth of the fish into the bend of the hook and simultaneously close the throat of the hook so that the fish cannot escape.

In these figures, 41 shows the spring eye, 42 shows the main shank, 43 shows the point, 44 shows the guard shank, 45 is the sheath, 45' is the indentation in the sheath, 46 is the leader or line, and 47 is the slide ring.

Figures 25, 26, 27, 28:
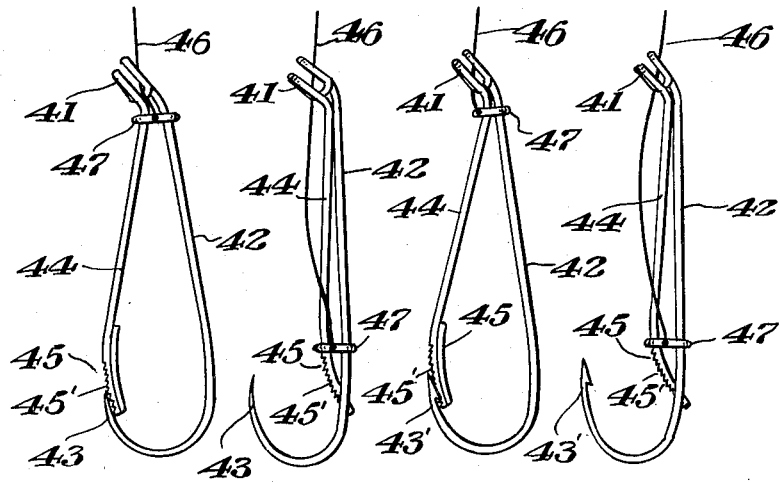
FIGURE 25 is a side elevational view of a barbless safety fish hook showing a further modification.
FIGURE 26 is a similar view showing the hook of FIGURE 25 in open operative position.
FIGURE 27 is a side elevational view of a barbed safety fish hook.
FIGURE 28 is a similar view of the hook of FIGURE 27 when in open position.

FIGURE 25 illustrates the single pointed barbless safety fish hook in which the slide ring 47 is positioned in the upper part of the shanks 44 and 42 and the point 43 is protected, by the sheath 45, from coming in contact with other objects when or when not in use.

FIGURE 26 shows FIGURE 25 in full operating position in which the slide ring 47 has been moved downward toward the bend of the hook bringing the guard shank into a locked position with the main shank 42 by the spring pressure and opening the hook to a full operating position. In order to make the drawings clear, the hook is shown unbaited in all cases. When a fish bites, strikes or pulls the hook when in full operating position, then a tensional force acts on the leader or line 46 so that the slide ring 47 easily slides up along the shanks 44 and 42 and comes into the position shown in FIGURE 25, and releases the guard shank 44 which returns to the position shown in FIGURE 25. Thus the sheath 45 of the guard shank 44 and the point 43 pinch the hooked fish and hold the fish firmly by the frictional force produced at this point by the inverted portion 45' on the sheath 45. When the partially hooked fish works downward into the curved bend the fish can not escape.

FIGURE 27 and FIGURE 28 illustrate the single pointed barbed safety fish hook 43' applied by the invented device and their functions are just the same as the case in FIGURE 25 and FIGURE 26.

Figures 29, 30, 31, 32:
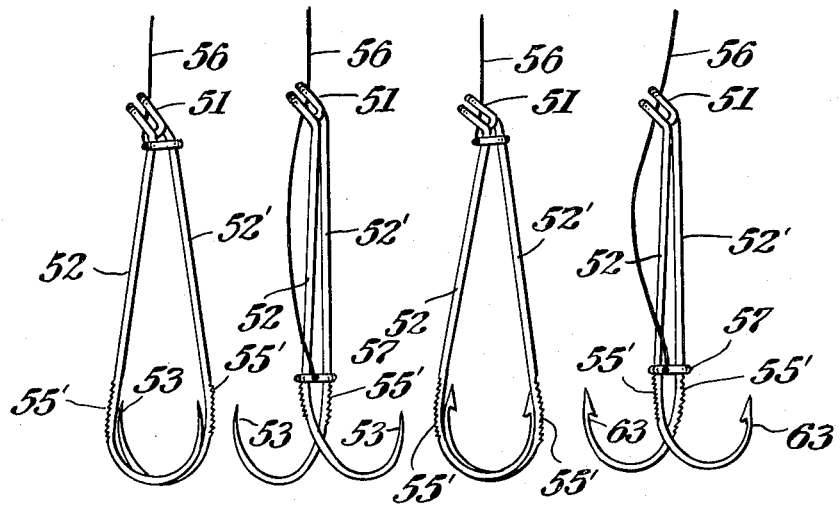
FIGURE 29 is a side elevational view of a double pointed barbless safety fish hook showing a further modification.
FIGURE 30 is a similar view of the hook of FIGURE 29 when in open operative position.
FIGURE 31 is a similar view of a barbed fish hook.
FIGURE 32 is a side view of the hook of FIGURE 31 when in open operative position.

FIGURE 29 and FIGURE 30 illustrate the double pointed barbless safety fish hooks applied by the invented device, 51 denoting the spring eye formed therebetween. In the double pointed safety fish hooks the main shanks 52 and 52' protect the curved points instead of the special guard shank 44 and sheath 45 shown in FIGURES 25 to 28.

FIGURE 29 illustrates the double pointed barbless safety fish hook when or when not in use. In this case the indentations 55' are applied on the outside of the shanks 52 and 52'. The use of 55' will be described hereinafter.

FIGURE 30 shows the double pointed barbless safety fish hooks of FIGURE 29 in full operating position. If the ring 57 moves downward it secures the shanks 52, 52' together as in the case of FIGURE 26. When a fish bites, strikes or pulls the hook, a tension action in the leader or line 56, slides the ring 57 upwardly to the position indicated in FIGURE 29, and the shanks are back to their original position also shown in FIGURE 29. Thus, the fish is pinched between the portion 55', 55' and points 53, 53, preventing the fish from escaping the hook by means of the frictional force produced by the indentations of 55', 55'.

FIGURE 31 and FIGURE 32 illustrate the double pointed barbed safety fish hooks 63 applied by the invented device, and their functions are the same as that in the case of FIGURES 29 and 30.

As described in the above, this invention is to provide a device for safety fish hooks having divergent shanks interconnected by a spring eye, one of said shanks being pointed and the other of said shanks having a guard sheath, which will maintain said shanks in parallel relationship and will automatically operate when a fish bites, strikes, or pulls the hooks and release the shanks from said parallel relationship whereby said guard sheath will be urged against the point of said pointed shank by the spring action of said spring to forcibly pinch a portion of a fish caught on said pointed shank to prevent said fish from becoming disengaged.

Furthermore, the effect of the leader or line passing through the spring eye and attached to the slider ring gives the whole system a stability so that it can always maintain a correct position in the water.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A fishing hook comprising a closed spring eye lying in one plane, a shank extending from said eye lying in another plane at an angle to said first plane, said shank being curved at its free end and having a sharp point forming a fish hook and a second shank extending from said eye lying in the same plane as said first shank, said eye urging said shanks away from one another to safeguard said fish hook.

2. A safety fish hook comprising a single fish hook comprising a closed spring eye located in one plane, two downwardly diverging shanks extending from said spring eye located in another plane at an angle to said first plane and urged to closed position by said eye, said shanks forming an acute angle to each other, the end portion of one of said shanks having an arcuate portion extending toward the other of said shanks and terminating in a pointed hook, said hook facing the spring eye and having a barb near the point thereof, the other of said shanks having a small oblong ring at its end, said ring forming a sheath with a slightly bent portion in its middle forming a groove, said sheath being maintained in light contact with the point of said hook on the side of said hook facing the shank from which the hook extends by the spring action of said spring eye so that the point is imbedded in the sheath and the point may be exposed by pushing said ring carrying shank around the back of said hook carrying shank and securing it thereto by fitting the main shank in said groove.

3. A safety fish hook comprising a single fish hook comprising a closed spring eye of spring steel wire located in one plane, the two end lengths of said wire extending from said spring eye being located in another plane at an angle to said first plane and forming a main shank and a guard shank extending at an acute angle to each other, the end portion of said main shank having an arcuate portion extending towards said guard shank and terminating in a pointed hook, said hook facing the spring eye, said guard shank having a small oblong ring at its end, said ring forming a sheath with a slightly bent portion in its middle forming a groove, said sheath being maintained in light contact with the point of said hook on the side of said hook facing the shank from which the hook extends by the spring action of said spring eye so that the point is imbedded in the sheath and the point may be exposed by pushing said ring carrying shank around the back of said hook carrying shank and securing it thereto by fitting the main shank in said groove.

4. A fishing hook comprising a closed spring eye lying in one plane, two downwardly diverging shanks extending from said spring eye located in another plane at an angle to said first plane and urged to closed position by said eye, one of said shanks having a sharp point on the free end thereof, the other of said shanks having a surface indented sheath normally contacting said point from inside said hook when in closed position.

5. A fish hook comprising a closed spring eye located in one plane, two lengths of wire extending from said eye forming main shanks, each shank having a groove and being bent close to said eye at an angle to said eye so as to lie in another plane intersecting said first plane, each end of said two shanks turning inward towards each other and forming bends, each upturned end forming hooks at the sections close to each point, the bends of each hook facing each other and being brought together so as to embrace each other through the elasticity of said spring eye with each hook point being kept against its opposing main shank in light contact, a movable guard ring encircling both shanks near said spring eye, said ring being free to slip down towards the bends in said hooks when said two main shanks are brought together to enter said grooves and thereby firmly keep said two hooks in open position.

6. A fish hook comprising a closed spring eye located in one plane, two downwardly diverging shanks extending from said spring eye located in another plane at an angle to said first plane and urged to closed position by said eye, a guard ring extending around said shanks movable along said shanks for securing said shanks together when said ring moves downwardly, said eye opening being in the direction of the downward line with the line passing through said spring eye and attached to said guard ring so that when tensions are applied to said line said guard ring is pulled upwardly releasing said shanks resulting in closing the hook and restoring said hook to a state of safety.

7. A fish hook comprising a closed spring eye located in one plane, a main shank and a guard shank, said shanks extending downwardly at an angle to said spring eye in a plane at an angle to said first plane, a guard ring extending around said shanks movable along said shanks for securing said shanks together when said ring moves downwardly, said eye opening being in the direction of the downward line so that when a line is passed through said spring eye and attached to said guard ring tensions applied to said line moves said guard ring upwardly releasing said shanks thereby resulting in closing the hook and restoring said hook to a state of safety.

8. A safety fish hook comprising a closed spring eye of metal wire located in one plane, the two end lengths of said wire extending from said spring eye at an angle to said eye to lie in another plane intersecting said first plane at an acute angle to one another, the end portion of one of said end lengths forming a main shank having an arcuate portion extending toward the other end length forming a guard shank and terminating in a pointed hook facing said spring eye, said guard shank having a small oblong ring at its end, said ring forming a sheath with a slightly bent portion forming a groove at its center, said sheath being maintained in light contact with the point of said hook on the side of said hook facing the shank from which the hook extends by the spring action of said spring eye so that the point is imbedded in the sheath and the point may be exposed by pushing said ring carrying shank around the back of said hook carrying shank and securing it thereto by fitting the main shank in said groove.

References Cited in the file of this patent

UNITED STATES PATENTS

| Number | Name | Date |
|---|---|---|
| 377,294 | Dietz | Jan. 31, 1888 |
| 390,028 | Loftie | Sept. 25, 1888 |
| 454,982 | Mack | June 30, 1891 |
| 720,449 | Little | Feb. 10, 1903 |
| 741,916 | Krus | Oct. 20, 1903 |
| 823,460 | Bingenheimer | June 12, 1906 |
| 828,964 | Phelps | Aug. 21, 1906 |
| 843,226 | Moore | Feb. 5, 1907 |
| 889,356 | Carpenter | June 2, 1908 |
| 1,526,133 | Gilmore | Feb. 10, 1925 |
| 1,869,293 | Wolford | July 26, 1932 |
| 2,119,504 | Lawrence | May 31, 1938 |
| 2,124,263 | Schott | July 19, 1938 |
| 2,234,516 | Clark | Mar. 11, 1941 |
| 2,241,320 | Sarff | May 6, 1941 |
| 2,554,735 | Gibson | May 29, 1951 |
| 2,604,681 | Van Dusen et al. | July 29, 1952 |